United States Patent [19]
Morris et al.

[11] Patent Number: 4,779,566
[45] Date of Patent: Oct. 25, 1988

[54] DISPOSABLE RECEPTACLE WITH INTEGRAL FLEXIBLE CLOSURE

[76] Inventors: Donald G. Morris, 9815 N. 100th Pl., Scottsdale, Ariz. 85258; Gregory J. Nelson, 4033 E. Highland, Phoenix, Ariz. 85018

[21] Appl. No.: 847,766

[22] Filed: Apr. 3, 1986

[51] Int. Cl.$^4$ ............................................. A01K 29/00
[52] U.S. Cl. ........................................... 119/1; 4/457
[58] Field of Search ....................... 119/1; 4/452, 484

[56] References Cited

U.S. PATENT DOCUMENTS

| | | | |
|---|---|---|---|
| 2,971,493 | 2/1961 | Robb | 119/1 |
| 3,332,397 | 7/1967 | Vander Wall | 119/1 |
| 3,422,985 | 1/1969 | Rinehart | 4/484 |
| 3,771,493 | 11/1973 | Chander | 4/452 X |
| 3,978,818 | 9/1976 | Heldenbrand | 119/1 |
| 4,171,680 | 10/1979 | Silver et al. | 119/1 |
| 4,505,226 | 3/1985 | Carlson | 119/1 |
| 4,615,300 | 10/1986 | McDonough | 119/1 |
| 4,616,598 | 10/1986 | Burniski et al. | 119/1 |

Primary Examiner—David A. Scherbel
Assistant Examiner—Creighton Smith
Attorney, Agent, or Firm—Gregory J. Nelson

[57] ABSTRACT

A disposable receptacle for animal and other waste having a rigid container for receiving an absorbent material and the deposited waste. A flange extends around the container and at least partially defines a channel which receives a flexible sleeve-like closure in a stored out-of-the-way position which has one end secured to the container. When the closure is unfolded, it extends over the container to close it and the free end of the closure may be gathered and secured by a twist tie.

12 Claims, 2 Drawing Sheets

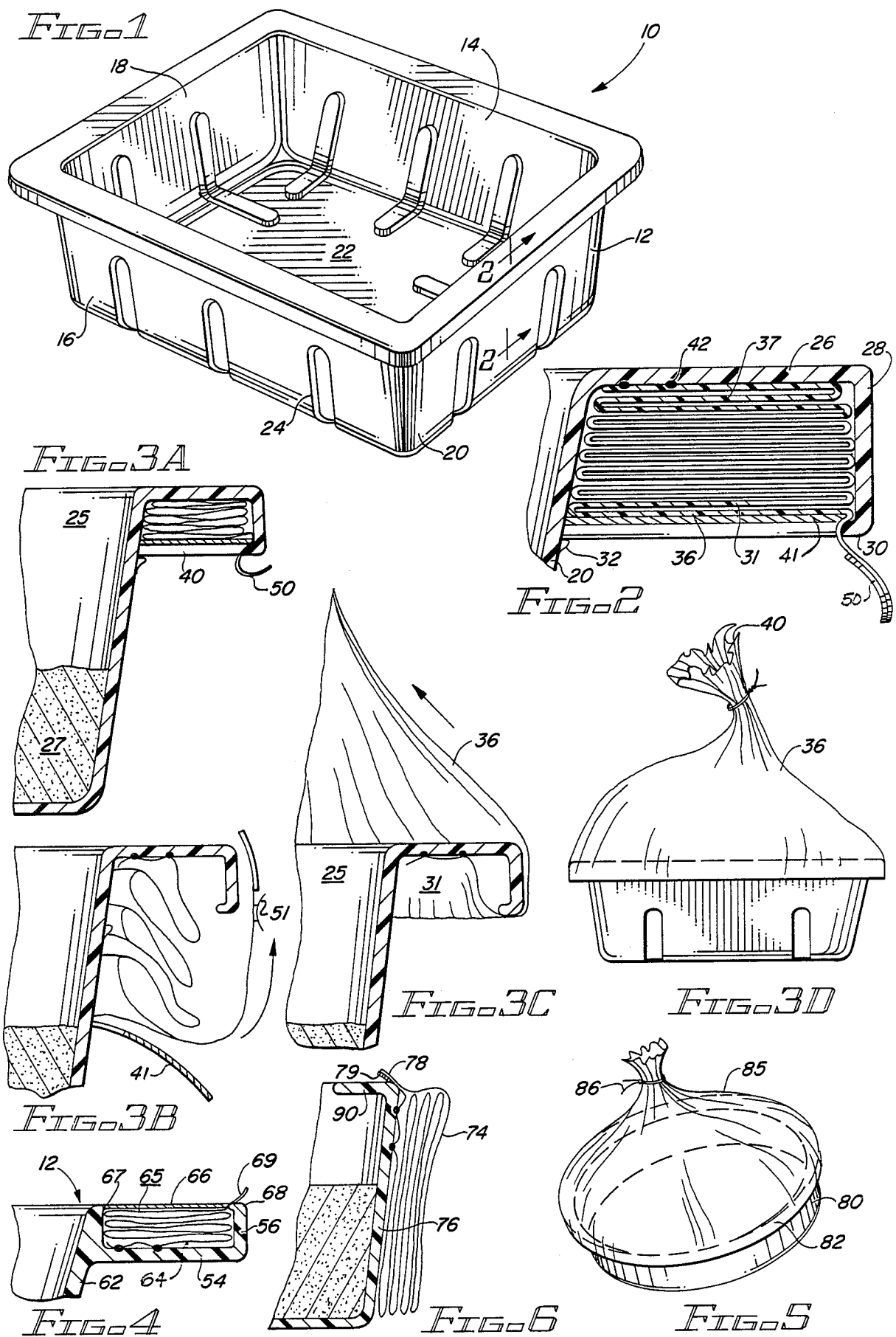

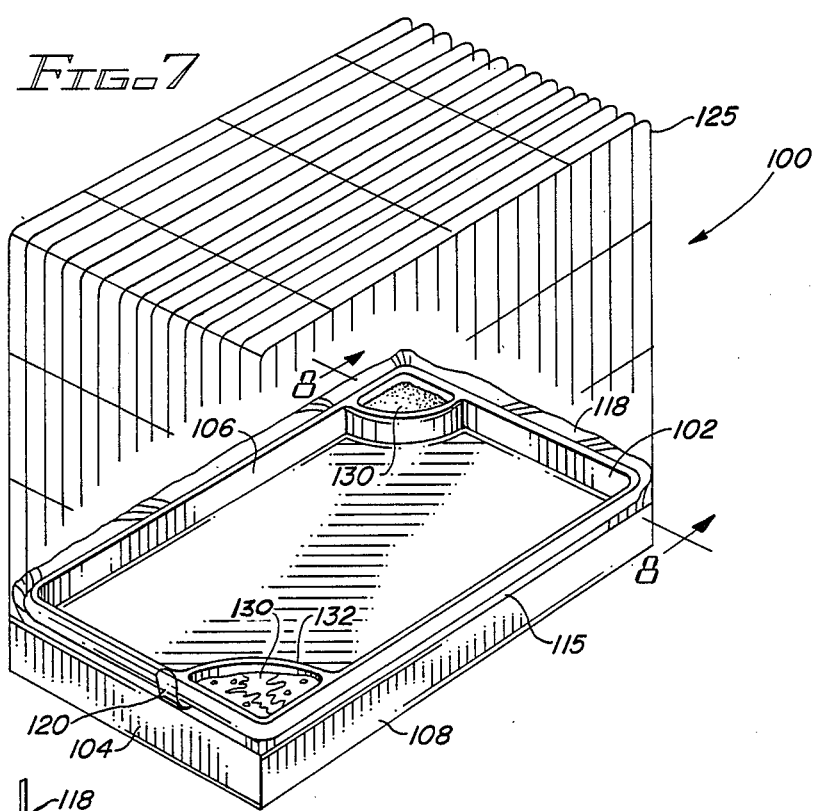
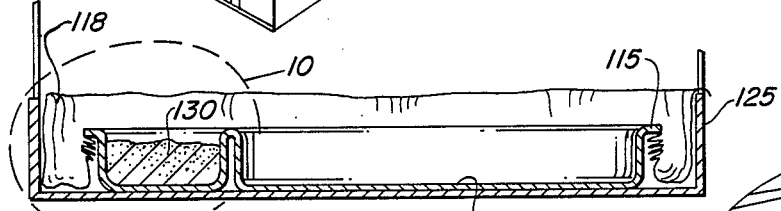
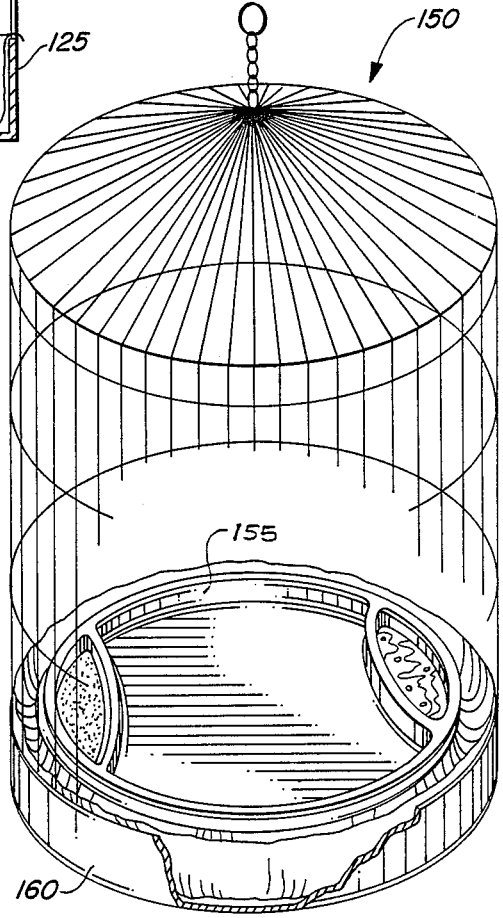
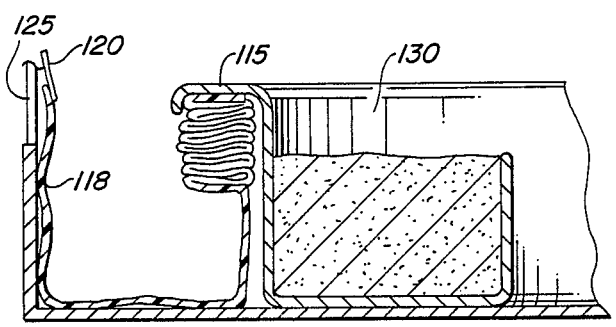

DISPOSABLE RECEPTACLE WITH INTEGRAL FLEXIBLE CLOSURE

The present invention relates to receptacles and more particularly relates to receptacles for receiving waste materials which receptacles are provided with an attached flexible closure to facilitate disposal of the waste with a minimal amount of contact.

There are many applications in which waste is collected and the waste is either unsanitary or is contaminated and therefore the individual wishes to minimize contact with the refuse or waste. Waste of this type can be found in medical facilities, chemical plants and the like. A common instance of this type of waste is in domestic situations where a pet owner provides a tray of filler material for pet waste for use by cats. A cat will urinate and defecate in the litter and after a period of time the litter must be removed and replaced with fresh litter. The cleaning procedure is obviously unpleasant and requires the pet owner to scoop out the contaminated litter or dump it into a trash receptacle and thereafter clean the tray and replace the litter. Similar situations exist with respect to bird cages where the liner in the bottom of the tray must be periodically removed and cleaned or disposed of and a fresh liner put in place. Numerous other situations exist with contaminated or unsanitary waste material which make the disposal procedure unpleasant or in some cases, due to the unsanitary and contaminated nature of the waste material, a health hazard.

Various types of containers for disposal of waste materials such as cat tray filler can be found in the prior art.

U.S. Pat. No. 3,771,493 shows a litter and waste receptacle for small pet animals such as cats comprising a basin and a removable liner which is secured in place by a detachable cover. The cover has an opening to allow the animal to enter and exit the basin. The liner is made of a relatively flexible disposable material such as polyethylene film to form to the shape of the basin and is removable from the basin for disposal.

A somewhat similar liner is shown in U.S. Pat. No. 4,279,217 in which the improved liner has an opening at the approximate center which communicates with a collapsible pocket which is adapted to lay flat beneath the liner when in use. As the liner is lifted out of the box, the soiled absorbant runs into the pocket for easy disposal. Other waste containers of the general type are shown in U.S. Pat. Nos. 3,831,557; 4,171,680; 3,978,818; and 4,308,825.

While devices and liners of the type mentioned above are widely used and make the removal of soiled litter a tolerable task, the liners all have a common problem. Animals, particularly cats, often will scratch or dig at the litter filler. Accordingly, the cat will frequently tear the liner and when the bag is attempted to be removed, the soiled absorbant will spill through the holes. The edge of the liner, if it is simply folded over the edge of the box, will tend to collapse into the box making removal more difficult. Cats will also tend to play with the loose liner scattering the contaminated material about. Further, in the removal operation, it is necessary for the owner to grasp the liner edge which is at least partially exposed and may have been soiled by the animal.

The present invention provides a convenient and effective receptacle for containing waste material, which is particularly applicable to animal litter containers, and which receptacle avoids spillage and eliminates the need for contact with any portion of the container which may have been soiled by the animal.

Further, with the present invention, the container in which the litter filler is received is a material resistant to tearing by the claws of the animal using the device.

The present invention provides a receptacle for containment of refuse and waste materials, particularly pet waste materials. The apparatus includes a rigid, scratch-resistant container for receiving the litter filler. A flange extends around the periphery of the container and a flexible closure is received in a channel defined at least partially by the flange. In the normal use-position, the flexible closure is received in an out-of-the-way position. One or more release tabs project from the flange and are attached to the closure. In a preferred form of the invention, the closure is adhesively or otherwise bonded to the container and is folded in pleats in the out-of-the-way position. When the tabs are pulled, the flexible closure unfolds across the open end of the container and may then be secured by a twist tie. The entire receptacle is then lifted by grasping the secured closure with the contained waste and carrying to a waste receptacle without spillage and without the user coming into contact with the refuse or any soiled portion of the receptacle. The receptacle may be variously sized and shaped to conform to the use and preference of the user. In other embodiments, the flexible closure may be secured at an upwardly opening channel or at one end of the rigid container and extended over the container opening for disposal.

The above and other advantages of the present invention will be better understood from the following specification and drawings in which:

FIG. 1 is a perspective view of the disposable waste receptacle of the present invention;

FIG. 2 is a sectional view taken along lines 2—2 of FIG. 1;

FIGS. 3A to 3C are sectional views similar to FIG. 2 illustrating release and extension of the flexible closure over the open container;

FIG. 3D is an end view of the receptacle with the closure gathered and sealed over the container portion of the receptacle;

FIG. 4 is a sectional view similar to FIG. 2 showing an alternate embodiment in which the channel receiving the flexible closure opens upwardly;

FIG. 5 is a sectional view of one end of a container of an alternate embodiment in which the closure is secured to the end wall of the container;

FIG. 6 is a perspective view of the receptacle and closure showing an alternate geometric shape for the receptacle;

FIG. 7 is a perspective view of an alternate form of the disposal container of the present invention for use in aviary cages;

FIG. 8 is a sectional view taken along lines 8—8 of FIG. 7;

FIG. 9 is a perspective view showing another shape of the invention for use as a waste receptacle in an aviary cage; and FIG. 10 is an enlarged detail view of a portion of FIG. 8.

Turning now to the drawings, particularly FIGS. 1 and 2, the disposable waste receptacle of the present invention is generally designated by the numeral 10 and includes a tray portion on container 12. Container 12 is shown as being generally rectangular in cross-section having opposite side walls 14 and 16 and end walls 18 and 20. A generally flat bottom 22 completes the construction of the container. The receptacle has an open top 25. For use as a receptacle for litter, the container is approximately fourteen inches wide, eighteen inches long and with a depth of three to four inches, suitable for reception of an absorbant filler material 27. Container 12 is preferably of a one-piece, seamless plastic molded construction, for example a high-impact polystyrene, polyethylene, vinyl or other similar polymeric materials which are resistant to tearing and scratching. The container is preferably made by vacuum forming or blow molding and has sufficient rigidity to retain its shape when used and to remain free-standing. In the instance of a cat filler tray, several pounds of material 27 would normally be placed on the bottom 22 of the container when in use filling the container to a depth of several inches. For improved structural integrity and rigidity, a plurality of reinforcing ribs 24 may be placed at selected locations around the side end walls of the container.

As best seen in FIG. 2, a continuous horizontal flange 26 extends around the opening 25 of the container and is integrally formed with the container walls. A continuous vertical flange 28 adjoins the horizontal flange 26 and has an inwardly turned lip 30 at its bottom edge. The flange and lip are also integrally formed with the container. A small projection 32 may be continuously formed on the side and end walls of the receptacle opposite lip 30. Accordingly, the horizontal flange 26 and vertical flange 28 define a downwardly opening channel 31 which extends entirely around the container. The configuration of the container described above permits efficient stacking of the receptacle for packaging and storing.

Channel 31 houses the flexible closure member 36 in a stored, out-of-the-way position until such time as it is desired to close the receptacle and dispose of the contents. The closure member 36 consists of a sleeve generally conforming to the shape of the container 10. The closure 36 is of a flexible liquid-impervious material such as polyethylene, or vinyl. Low-density polyethylene film commonly used for household trash bags is suitable. The film should be thick enough to support the rigid container 12 and contents when lifted. For animal refuse applications, a thickness in the range of about one to two mils is adequate.

One end of the closure 36 is permanently secured to the underside of the horizontal flange 26 at location 42 by welding or by application of adhesive. The flexible closure is folded upon itself forming a number of individual pleats 37. The extended length of the closure is sufficient to completely cover the container and allow the user to easily gather the open top 40 of the closure as shown in FIG. 3D.

Although the closure 36 may be packed in pleated fashion as shown in FIG. 2, the closure may be packed in other configurations, as for example in a loose "parachute" style. The pleated configuration is preferred as it allows for efficient unfolding of the closure and the closure 36 occupies a minimum of space in the folded condition.

The closure 36 is retained in the peripheral channel 31 by an annular retaining member 41 which may be a piece of plastic or cardboard which is frictionally retained in place by the oppositely projecting lip members 30 and 32. At one or more peripheral locations, preferably oppositely disposed from one another, the annular member 41 is slotted to allow projecting tabs 50 to depend therethrough, the tabs 50 have one end secured to the open end 40 of the closure. The tabs may be an integrally formed portion of the closure or may be bonded to the sleeve. Preferably the tab is configured and is sized to provide a surface convenient for the user to grasp between the thumb and forefinger. As seen in FIG. 3B, a wire twist tie 51 is adhesively secured either to the tab or to a portion of the closure 36 by adhesive tape or other convenient means for convenient access to the user.

When the receptacle is used for animal waste, it is filled with a suitable absorbant material 27. For other applications, various other absorbant materials may be used or in many applications absorbant material may not be necessary. When the absorbant material becomes soiled or it is otherwise desired to dispose of the contents of the container, the user will simply grasp the oppositely positioned tabs 50 giving a sharp downward pull. As shown in FIG. 3B, the peripheral retainer 41 will be dislodged, allowing the flexible closure 36 to extend. As the closure expands, it can then be pulled upwardly around the vertical flange 28 until the container opening 25 is enclosed. The upper free end of the closure is gathered and the wire twist tie 51 removed from its location on the sleeve and the open end sealed as shown in FIG. 3D. The entire receptacle and contents can then be carried to a waste receptacle without spillage and without contact with the contents. Further, since the channel 31 opens downwardly, the flexible closure 36 is protected during the period of time that the waste is being deposited in the container. In the case of a cat litter box, any urine or fecal matter that may accumulate, even on the upper surface of the flange 26, need not be touched by the pet owner as it is not necessary to contact these surfaces when releasing the closure and securing the flexible closure member over the subjacent receptacle. Thus, for example, a cat does not have easy access to the closure and tearing or shredding of the flexible closure by the animal is avoided.

FIG. 4 shows an alternate embodiment of the invention in which the rigid container 12 is formed with a side wall 62 from which horizontally extends a flange 54 and an upwardly extending peripheral flange 56. Again, a flexible closure 64 conforming to the configuration of the container 62 is packed in the channel 65 formed by the flanges 54 and 56. An annular retainer 66 is frictionally held in place by oppositely extending projections 67 and 68. The annular retainer 66 serves to retain the flexible closure member in a packed condition within the channel and protect it during use. Tab 69 is pulled to release the closure in the manner explained with reference to FIGS. 1 to 3. In other respects the construction and use of the receptacle is as has been described above.

As shown in FIG. 5, the rigid container 80 may be of any desired geometric shape. In FIG. 5, the rigid container 80 is shown as being generally round in crosssection having a peripheral flange 82 which defines a downwardly opening channel for receiving the flexible closure member 85. The closure member is released and gathered over the opening of the container 80 and secured by a suitable tie 86.

In FIG. 6 the rigid container 90 is impervious to liquid and may be fabricated as a one-piece seamless plastic molded construction. A flexible plastic sleeve 74 is bonded to one vertical side wall 76 of the container. Preferably, the side wall 76 is one of the narrower walls if the configuration is rectangular. The sleeve is folded on itself in a stored position and secured in place by sealed tab 78 which has an adhesive surface 79 which may be secured to the upper end of the wall to retain the sleeve in the folded condition. When the container and the contents are to be readied for disposal, the tab 78 is peeled from the container allowing the sleeve to be extended longitudinally over the entire container with the open end gathered at the opposite end of the container and secured by a suitable twist tie.

FIGS. 7, 8 and show an alternate embodiment of the present invention generally designated by the numeral 100. In this embodiment, the container again has opposite end walls 102, 104 and opposite side walls 106, 108 with a horizontally extending bottom 110 forming an open receptacle. The container is generally rectangular and has an annularly extending flange 115 which houses a flexible closure 118 in the stored position. Tab 120 is provided at the opposite end walls to facilitate release of the flexible closure.

The embodiment 100 is particularly designed for use in aviary cages and may be placed in the bottom of the cage 125 as shown in FIG. 9 as an alternative to use of newspapers and other liners. The receptacle is placed in the cage and the closure 118 partially extended as shown in FIG. 8 to completely cover the bottom of the cage. When it is desired to remove the tray and contents the edges of the closure are grasped and pulled over the receptacle and gathered at the top as has been described above.

A further feature of the receptacle of the embodiment 100 is the inclusion of compartments 130 at opposite corners of the receptacle. The containers are defined by adjacent side walls and end walls and an annular inner partition 132 extending diagonally between the end wall and side wall, thus forming a generally triangular shaped compartment at either corner for reception of water and bird seed.

FIG. 9 illustrates an embodiment of the invention 150 similar to that of FIG. 7 having a round receptacle 155 adaptable for use in round cages 160.

The foregoing is descriptive of several preferred embodiments to the present invention. It will be obvious to those skilled in the art to make various changes, alterations and modifications to the embodiments described herein. To the extent these modifications, changes and alterations do not depart from the spirit and scope of the appended claims, they are intended to be encompassed therein.

We claim:
1. A disposable receptacle for waste comprising:
 (a) a free-standing substantially rigid container having side walls and a bottom defining a compartment having an opening for receiving waste:
 (b) at least a portion of said walls defining a storage surface; and
 (c) flexible closure means secured at said storage surface in a normally out-of-the-way storage position, said flexible closure comprising a sleeve having a free end and adapted to extend over the said container opening when extended to close the container and whereby the free end of the closure may be grasped to lift the container and contained waste for disposal.
2. The receptacle of claim 1 wherein said storage surface comprises a peripheral flange extending about an upper edge of said side walls defining an open channel.
3. The receptacle of claim 2 wherein said closure comprises a flexible film which is secured in said channel in an out-of-the-way position in a normal storage position.
4. The receptacle of claim 3 wherein at least one projecting tab is secured to said closure to facilitate extension of the closure from the said channel.
5. The receptacle of claim 4 wherein a removable annular retainer member is frictionally secured in said channel to maintain said closure in said stored position.
6. The receptacle of claim 4 wherein said channel is downwardly opening about the periphery of the receptacle.
7. The receptacle of claim 4 wherein said channel is generally upwardly opening.
8. The receptacle of claim 1 wherein said receptacle is molded from a rigid plastic material and said closure comprises a flexible synthetic film.
9. The receptacle of claim 8 wherein a twist tie member is detachably secured to said closure member.
10. The receptacle of claim 1 wherein said closure is adhesively bonded to said receptacle.
11. The receptacle of claim 3 wherein said side walls diverge upwardly whereby multiple receptacles are stackable.
12. A disposable receptacle for animal waste comprising:
 (a) a rigid container having side walls having an upper edge and a bottom defining a compartment for receiving the waste, said compartment having an open top;
 (b) integral flange means extending about the outer periphery of said container adjacent the said upper edge of said side walls, said flange means defining a channel; and
 (c) closure means having a generally sleeve-like configuration having one end secured to said container and having an opposite open end, said closure means having a stored out-of-the-way position received in said channel, said closure means being flexible and adapted to extend over said open top when unfolded to close the container, whereby the open end may be gathered for manual transportation and disposal of the entire receptacle and contents.

* * * * *